UNITED STATES PATENT OFFICE.

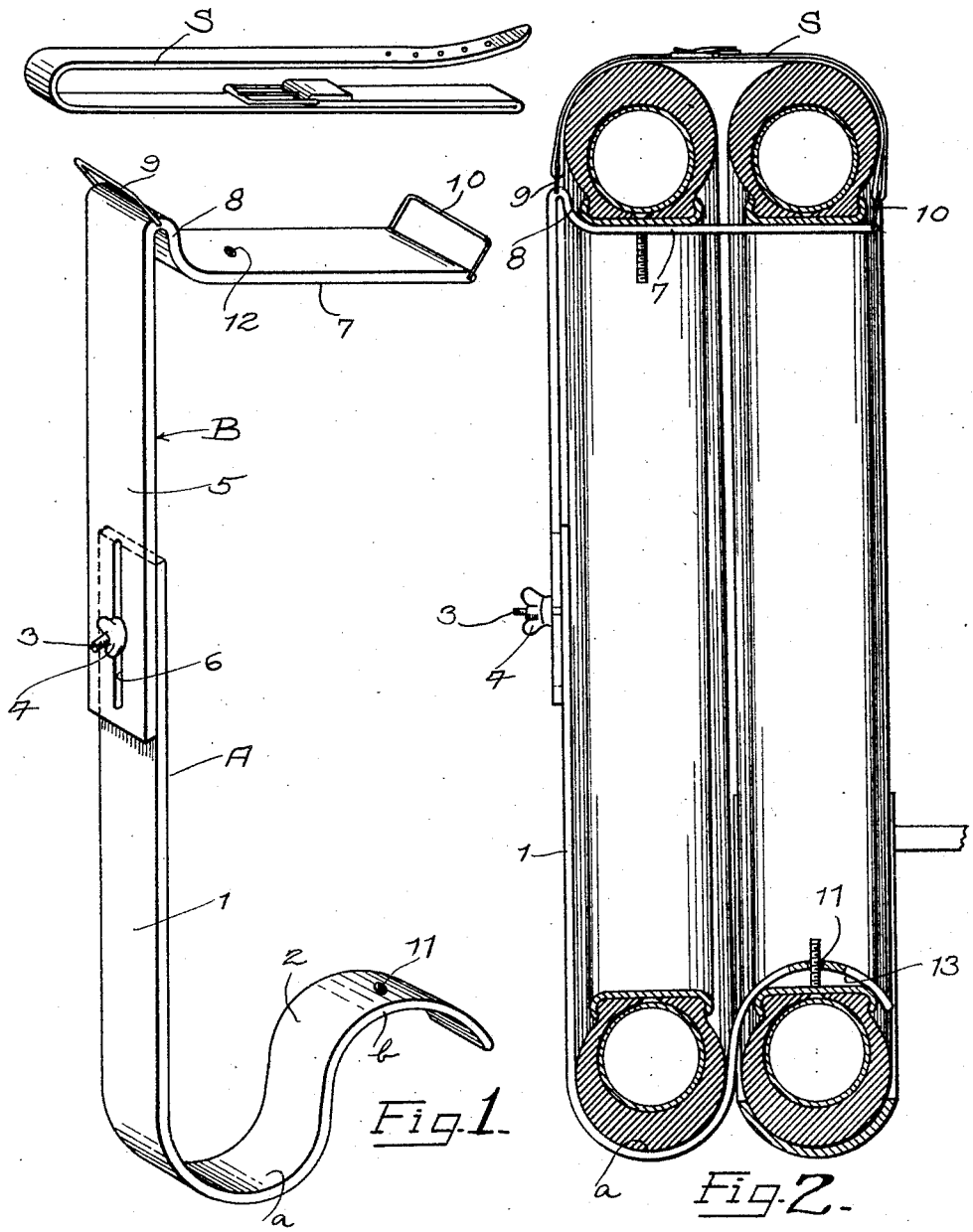

BEECHER FRANK, OF CLEVELAND, OHIO.

TIRE HOLDER.

1,417,817.     Specification of Letters Patent.     Patented May 30, 1922.

Application filed February 19, 1921. Serial No. 446,277.

*To all whom it may concern:*

Be it known that I, BEECHER FRANK, a citizen of the United States, residing at Cleveland, in the county of Cuyahoga and State of Ohio, have invented certain new and useful Improvements in Tire Holders, of which the following is a specification, reference being had to the accompanying drawings.

This invention relates to certain improvements in tire holders and has relation more particularly to a device of this general character especially designed and adapted for use in connection with an extra spare tire, and it is an object of the invention to provide a device of this character having novel and improved means whereby an extra spare tire may be readily and conveniently supported by a first spare tire carried in any desired manner by a vehicle.

Another object of the invention is to provide a novel and improved device of this general character embodying two relatively adjustable members whereby the device may be employed to advantage in connection with tires of differing diameters.

The invention consists in the details of construction and in the combination and arrangement of the several parts of my improved tire holder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a combined perspective of my improved spare tire holder and the strap employed with the same, and Figure 2 is a sectional view illustrating the use thereof.

As disclosed in the accompanying drawings, my improved holder comprises two members A and B adapted to have adjustable connection one with respect to the other so that the device in its entirety may be employed with equal advantage in connection with tires of differing diameters.

The member A embodies an elongated plate or strip 1 terminating at one end portion in a lateral extension 2, said extension being sigmoidal in form to provide the oppositely facing saddles *a* and *b*, the inner saddle *a* being disposed inwardly of the plate or strip 1.

The opposite end portion of the plate or strip 1 is provided with an outstanding threaded shank 3 disposed in a direction away from the extension 2 hereinbefore referred to. Associated with the shank 3 is a clamping member or nut 4 for a purpose to be hereinafter more particularly referred to.

The member B embodies an elongated strip or plate 5 which, when my improved holder is assembled, overlies an end portion of the plate or strip 1 of the member A. The plate or strip 5 is provided with a longitudinally disposed slot 6 of desired length through which the shank 3 is disposed, whereby the members A and B may be adjusted one with respect to the other, the member or nut 4 associated with the shank 3 operating to clamp the members A and B in their different relative adjustments.

The outer end of the plate or strip 5 is provided with a lateral extension 7 disposed in the same direction as the extension 2 embodied in the member A. The extension 7 is substantially straight throughout the major portion of its length but its inner end portion 8 is directed upwardly on a desired incline and merges into the plate or strip 5. The inclined portion 8 provides an open loop in which is adapted to be engaged a bar of a loop member 9. The outer or free end portion of the extension 7 has hingedly or pivotally engaged therewith a second loop member 10.

The extension 2 of the member A at the central portion of the saddle *b* has disposed therethrough an opening 11 while the extension 7 of the member B at a point in substantially close proximity of the inclined portion 8 of said extension is provided with an opening 12.

My improved holder, as herein disclosed, is particularly adapted for use in attaching an extra spare tire to a spare tire carried by an automobile or other vehicle in any ordinary or preferred manner. In practice, the extra spare tire is seated within the saddle *a* and the saddle *b* is engaged over the first spare tire carried by the vehicle in any desired manner, with the stem of the inflating valve of the first spare tire extending through the opening 11 in the extension 2.

The plate or strip 5 of the member B is then disposed over the plate or strip 1 of the member A with the shank 3 extending through the slot 6. The member B is then moved lengthwise with respect to the member A until the extension 7 of the member B is brought into contact with the inner faces or rims of the extra spare tires, whereupon the member or nut 4 is then tightened to clamp the members A and B against relative movement. A strap S is then threaded through the loops 9 and 10 and disposed over the peripheral or tread portions of the spare tires, whereby the extra or second spare tire is effectively supported by the first spare tire which is carried by the vehicle in a conventional manner.

It will be understood that my improved holder may be employed to apply additional spare tires but as this is believed to be obvious an illustration thereof is thought unnecessary.

From the foregoing description it is thought to be obvious that a tire holder constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire holder for extra tires comprising a body member provided at one end portion with reversely directed saddles extending laterally therefrom, one of said saddles being adapted to engage a tire from without and the adjacent saddle being adapted to engage the second tire from within, the opposite end portion of the body member being provided with an extension disposed in the same general direction as the saddles, said extension being adapted to extend through the central opening defined by the applied tires, and a securing means coacting with the second named extension and adapted to extend over the applied tires.

2. A tire holder for extra tires comprising a body member provided at one end portion with reversely directed saddles extending laterally therefrom, one of said saddles being adapted to engage a tire from without and the adjacent saddle being adapted to engage the second tire from within, the opposite end portion of the body member being provided with an extension disposed in the same general direction as the saddles, said extension being adapted to extend through the central opening defined by the applied tires, a securing means coacting with the second named extension and adapted to extend over the applied tires, said body member comprising two relatively adjustable parts, and means for locking said parts in their adjusted positions.

3. A holder of the class described comprising an elongated body member provided at one end portion with a lateral extension, said extension being sigmoidal to provide oppositely facing saddles, one of said saddles being adapted to engage a tire from without and the adjacent saddle being adapted to engage the second tire from within, an extension carried by the opposite end portion of the body member, said extension being adapted to extend through the central opening defined by the applied tires, and securing means carried by said second named extension and adapted to extend over the applied tires.

4. A holder of the class described comprising an elongated body member provided at one end portion with a lateral extension, said extension being sigmoidal to provide oppositely facing saddles, one of said saddles being adapted to engage a tire from without and the adjacent saddle being adapted to engage the second tire from within, an extension carried by the opposite end portion of the body member, said extension being adapted to extend through the central opening defined by the applied tires, and securing means carried by said second named extension and adapted to extend over the applied tires, the inner saddle of the first named extension facing inwardly of the body member.

5. A holder of the class described comprising two members having adjacent end portions in overlying relation, means coacting with the overlying portions of the members for holding the same against relative movement, a lateral extension carried by the outer end portion of one of the members and provided with oppositely facing saddles, one of said saddles being adapted to engage a tire from without and the adjacent saddle being adapted to engage the second tire from within, a lateral extension carried by the outer end portion of the second member and disposed in the same general direction as the extension of the first named member, said extension being adapted to extend through the central opening defined by the applied tires, and securing means carried by the second named extension and adapted to extend over the applied tires.

6. A tire holder for extra tires comprising a body member provided at one end portion with reversely directed saddles extending laterally therefrom, one of said saddles being adapted to engage a tire from without and the adjacent saddle being adapted to engage the second tire from within, the opposite end portion of the body member being provided with an extension disposed in the same general direction as the saddles, said extension being adapted to extend through the central opening defined by the applied tires, loops carried by the opposite end portions of the extensions, and a flexible securing member engageable with said loops and adapted to extend over the applied tires.

7. A tire holder for extra tires comprising a body member provided at one end portion with reversely directed saddles extending laterally therefrom, one of said saddles being adapted to engage a tire from without and the adjacent saddle being adapted to engage the second tire from within, the opposite end portion of the body member being provided with an extension disposed in the same general direction as the saddles, said extension being adapted to extend through the central opening defined by the applied tires, and a securing means coacting with the second named extension and adapted to extend over the applied tires, one of said saddles being provided with an opening through which is adapted to extend the valve stem of an applied tire.

8. A tire holder for extra tires comprising a body member provided at one end portion with reversely directed saddles extending laterally therefrom, one of said saddles being adapted to engage a tire from without and the adjacent saddle being adapted to engage the second tire from within, the opposite end portion of the body member being provided with an extension disposed in the same general direction as the saddles, said extension being adapted to extend through the central opening defined by the applied tires, and a securing means coacting with the second named extension and adapted to extend over the applied tires, said extension being provided with an opening through which is adapted to be disposed the valve stem of an applied tire.

In testimony whereof I hereunto affix my signature.

BEECHER FRANK.